(12) United States Patent
Schwert et al.

(10) Patent No.: US 9,816,660 B2
(45) Date of Patent: Nov. 14, 2017

(54) LINING HOSE, RENOVATED PRESSURE PIPE AND METHOD FOR RENOVATING A PRESSURE PIPE

(71) Applicants: Siegfried Schwert, Berlin (DE); Ralf Odenwald, Velten (DE)

(72) Inventors: Siegfried Schwert, Berlin (DE); Ralf Odenwald, Velten (DE)

( * ) Notice: Subject to any disclaimer, the term of this patent is extended or adjusted under 35 U.S.C. 154(b) by 291 days.

(21) Appl. No.: 14/436,748

(22) PCT Filed: Oct. 17, 2013

(86) PCT No.: PCT/EP2013/071799
§ 371 (c)(1),
(2) Date: Apr. 17, 2015

(87) PCT Pub. No.: WO2014/060558
PCT Pub. Date: Apr. 24, 2014

(65) Prior Publication Data
US 2016/0169437 A1      Jun. 16, 2016

(30) Foreign Application Priority Data

Oct. 18, 2012   (EP) .................................... 12075119

(51) Int. Cl.
*F16L 55/16*       (2006.01)
*F16L 57/00*       (2006.01)
(Continued)

(52) U.S. Cl.
CPC .............. *F16L 57/00* (2013.01); *B29C 63/34* (2013.01); *B29C 65/48* (2013.01); *B32B 1/08* (2013.01);
(Continued)

(58) Field of Classification Search
CPC ............................ F16L 55/1656; F16L 55/165
(Continued)

(56) References Cited

U.S. PATENT DOCUMENTS 5,077,107 A * 12/1991 Kaneda ..................... B32B 1/08
                                                                  138/125
5,164,237 A * 11/1992 Kaneda ..................... B32B 1/08
                                                                  138/125
(Continued)

FOREIGN PATENT DOCUMENTS

CN         101626884 A        1/2010
DE            19910490         9/2000
(Continued)

OTHER PUBLICATIONS

"International Application No. PCT/EP2013/071799, International Search Report and Written Opinion dated Mar. 4, 2014, with English translation of ISR", (Mar. 4, 2014), 17 pgs.

*Primary Examiner* — Patrick F Brinson
(74) *Attorney, Agent, or Firm* — Schwegman Lundberg & Woessner, P.A.

(57) ABSTRACT

The subject matter of the invention is a lining hose as a composite hose for lining a pressure pipe to be renovated, comprising at least one first layer and a second layer which adjoins the first layer, the first layer forming a substantially fluid-tight and/or gas-tight diffusion barrier and the second layer being a textile fabric soaked in a resin and being provided for an all-over adhesive connection to an inner wall of the pressure pipe to be renovated, the lining hose being flexible in a state in which the resin has not cured. The second layer is at least 3 mm thick, the textile fabric and the resin being selected such that the lining hose forms a self-supporting pipe in a state in which the resin has cured. The invention also relates to a method for renovating a pressure pipe using such a lining hose and a corresponding renovated pressure pipe.

15 Claims, 4 Drawing Sheets

(51) Int. Cl.
*B32B 27/12* (2006.01)
*B29C 63/34* (2006.01)
*B32B 1/08* (2006.01)
*F16L 55/165* (2006.01)
*B29C 65/48* (2006.01)
*B29L 23/00* (2006.01)

(52) U.S. Cl.
CPC .......... *B32B 27/12* (2013.01); *F16L 55/1651* (2013.01); *F16L 55/1652* (2013.01); *F16L 55/1656* (2013.01); *B29L 2023/006* (2013.01); *B29L 2023/22* (2013.01); *B32B 2260/021* (2013.01); *B32B 2260/023* (2013.01); *B32B 2260/046* (2013.01); *B32B 2262/0276* (2013.01); *B32B 2262/0284* (2013.01); *B32B 2262/101* (2013.01); *B32B 2262/106* (2013.01); *B32B 2597/00* (2013.01)

(58) Field of Classification Search
USPC ..... 138/98, 97; 156/287, 293, 294; 264/269, 264/267; 405/184.2, 150.1
See application file for complete search history.

(56) References Cited

U.S. PATENT DOCUMENTS

| | | | | |
|---|---|---|---|---|
| 5,186,987 A | * | 2/1993 | Imoto | ................ B32B 5/26 138/128 |
| 5,334,429 A | * | 8/1994 | Imoto | .................... B29C 63/34 138/128 |
| 5,411,060 A | * | 5/1995 | Chandler | ................ B29C 63/34 138/103 |
| 5,653,555 A | | 8/1997 | Catallo | |
| 6,042,668 A | * | 3/2000 | Kamiyama | ............. B29C 53/48 138/98 |
| 6,170,531 B1 | * | 1/2001 | Jung | ........................ E03F 3/06 138/97 |
| 6,360,780 B1 | * | 3/2002 | Adolphs | ............. F16L 55/1656 138/130 |
| 7,028,716 B2 | * | 4/2006 | Kaneta | .................. F16L 55/179 138/97 |
| 7,891,381 B2 | * | 2/2011 | Anders | ............... F16L 55/1651 138/97 |
| 8,636,869 B2 | | 1/2014 | Wiessner et al. | |
| 2003/0138298 A1 | | 7/2003 | Mercier | |
| 2012/0043006 A1 | * | 2/2012 | Noll | .................... F16L 55/1656 156/62.2 |

FOREIGN PATENT DOCUMENTS

| | | |
|---|---|---|
| EP | 0205621 | 12/1986 |
| EP | 0351570 | 1/1990 |
| EP | 0454309 | 10/1991 |
| WO | WO-00/15992 | 3/2000 |
| WO | WO-00/25057 | 5/2000 |
| WO | WO-01/18444 | 3/2001 |
| WO | WO-2006/061129 | 6/2006 |
| WO | WO-2014/060558 | 4/2014 |

* cited by examiner

LINING HOSE, RENOVATED PRESSURE PIPE AND METHOD FOR RENOVATING A PRESSURE PIPE

PRIORITY CLAIM TO RELATED APPLICATIONS

This application is a U.S. national stage application filed under 35 U.S.C. §371 from International Application Serial No. PCT/EP2013/071799, which was filed Oct. 17, 2013, and published as WO 2014/060558 on Apr. 24, 2014, and which claims priority to European Patent Application No. 12075119.3, filed Oct. 18, 2012, which applications and publication are incorporated by reference as if reproduced herein and made a part hereof in their entirety, and the benefit of priority of each of which is claimed herein.

TECHNICAL FIELD

The subject-matter of the present invention is a lining hose for lining a pressure pipe to be renovated, according to the preamble of the main claim, a pressure pipe which is renovated amid the use of such a lining hose, as well as a method for renovating a pressure pipe amid the use of the respective lining hose. The main field of application is pressure conduits, in which a fluid, such as natural gas or water, is transported at a high pressure as the case may be.

BACKGROUND OF THE INVENTION

It is known to incorporate coated hoses for lining and renovating a pressure pipe by way of reversing or drawing (pulling) into the old pipe, wherein a surface of the hose which lies at the outside after the incorporation is bonded to the inner wall of the old pipe to be lined. Such a hose is to be deduced for example from WO 00/25057 A1.

Such hoses are in the position of overcoming leaks of pressure pipes which are subject to leakage. Pipes renovated in this manner however can only withstand a high pressure, if the old pipe itself is still in the position of being able to accommodate adequately high mechanical loads, and the hose firmly bears on the inner side of the pressure pipe to be renovated and is thus mechanically supported by the old pipe. However, it is often the case that an existing pipe conduit is no longer capable of dealing with the high transport pressures of the medium, as well as external loads, due to heavy surface corrosion or other types of pipe weakening. The document EP 0 205 621 A1 discloses a lining hose which in the cured condition is also capable of accommodating mechanical loads, at least to a limited extent. Despite this, one cannot rule out a pressure pipe renovated with such a lining hose not being able to adequately accommodate high pressures and not being able to withstand external mechanical loads, if the old pipe has been too greatly weakened. In this case, conventional renovation methods therefore envisage drawing a new self-supporting pipe within the pressure pipe conduit to be renovated or exchanging the complete pressure pipe conduit in an open construction manner, which in the usual case entails a significant increase in cost and effort.

SUMMARY

It is the object of the present invention, to solve the above-mentioned problem and to put forward a measure which permits a pressure pipe conduit weakened with regard to its static characteristics, to be renovated with as little as possible effort, even if the pressure pipe conduit under certain circumstances does not run in a straight manner. Thereby, the renovated pressure pipe conduit should be able to withstand all mechanical loads occurring due to operation, independently of the extent to which it was previously weakened.

This object is achieved by way of a lining hose according to the main claim a well as by a pressure pipe with the features of claim 13 which is created by way of such a lining hose forming a new pipe in the old pipe, and by way of a method for the use of a lining hose according to the invention, according to the features of claim 14. Special embodiments and further developments are to be deduced from the features of the dependent claims.

The suggested lining hose for lining a pressure pipe to be renovated comprises at least one first layer and a second layer which is adjacent to the first layer, wherein the first layer forms a fluid-tight and/or gas-tight diffusion barrier and wherein the second layer is a textile sheet formation which is impregnated with resin and is configured for a gapless and full-surfaced, non-positive bonding connection to an inner surface of the pressure pipe to be renovated, wherein the lining hose is flexible in a condition, in which the resin is not cured. Thereby, the second layer has a thickness of at least 3 mm, wherein the textile sheet formation and the resin are selected such that the lining hose forms a self-supporting pipe, in a condition in which the resin is cured, wherein the second layer functions as a statically effective layer of this self-supporting hose.

The invention permits pressure pipes to be renovated, to be lined with a self-supporting pipe in a particularly simple manner, wherein it is of no consequence if the pressure pipe to be renovated has direction changes. Pipe conduits which, in contrast to free-flowing conduits or gravity conduits, are designed for the transport of liquid or gaseous media under pressure and typically belong at least to the rated (nominal) pressure class PN1 defined in DIN standard 16868-1 are indicated as pressure pipes. Due to the fact that the lining hose is flexible before the curing of the resin, it can be adapted to the contour of the pressure pipe to be renovated, when it is introduced into the pressure pipe to be renovated. It advantageously forms the production of a self-supporting pipe after the subsequent curing of the resin, so that one obtains a renovated pressure pipe which is also adequately stable and mechanical loadable even, if the old pipe which has only yet served as a shape is weakened to such an extent that it is no longer capable of accommodating loads. The renovation, in particular of greatly weakened old pipes, is simplified by way of this, and these old pipes are renovated with a high quantity and very little effort by way of this, and their service life can be increased significantly analogously to a new pipe conduit. A particular advantage thereby results due to the fact that the mechanical loading ability can be restored again, as well as leakages alleviated, in a single working procedure or step. The renovation in only one working step or operation thereby not only reduces the effort necessary for the renovation process, but also increases the design quality, since no excessive reductions in cross section thereby occur, wherein these would be hardly avoidable with a renovation in several working steps, i.e. by way of two hoses in two working steps or operations, in particular with direction changes. The throughflow of media as a rule is not reduced due to the smooth surface structure, despite the cross-sectional loss, which is only very slight in any case with the application of the present lining hose.

The textile sheet formation can e.g. be a woven fabric or a knitted fabric or a crocheted fabric or laid webs—in the latter mentioned case preferably multi-axial laid webs—or a mat, which can be formed e.g. by way of a combination of the mentioned material types. In any case, it is a two-dimensional material which is formed at least chiefly from fibres and which together with the resin, after the curing of this, forms a fibre-reinforced plastic which gives the self-supporting pipe formed by the lining hose after curing, the necessary static properties, thus the necessary stiffness. The fibres thus not only serve as resin carriers, as would be the case if for their part they were to be formed from a material corresponding to the resin or a of a similar artificial resin, but rather, with regard to the fibres, it is the case of a real reinforcement, by way of which the fibre-reinforced plastic which is formed from the resin and the textile sheet formation has a greater tensile loading capacity, than the resin without fibres would have after the curing. Thereby, the textile sheet formation can be formed e.g. from glass fibres or carbon fibres.

With regard to the resin, it is the case of an unsaturated polyester resin or an unsaturated vinyl ester resin or of a resin which comprises an unsaturated polyester resin or an unsaturated vinyl ester resin The unsaturated polyester resin or the unsaturated vinyl ester resin thereby preferably forms the main part of the resin. The resin in an embodiment which is explained in more detail further below is given by a mixture of a first component and a second component, wherein with regard to the first component it is the case of the vinyl ester resin or the polyester resin with a mixture share of between 50% and 95%. The required stability of the pipe which is formed from the lining hose after the curing can be realised with comparatively low material costs by way of such thermosets. The resin can thereby contain styrene or be free of styrene. The use of styrene-free resin is thereby advantageous for environmental and work protection reasons. A resin share of the second layer manufactured from the resin and the textile sheet formation can be e.g. between 30% and 70%.

It is possible to simply obtain a renovated pressure pipe of advantageously good quality due to the designated use of a lining hose of the type suggested here. Thereby, the renovated pressure pipe comprises an old pipe as well as self-supporting pipe arranged within the old pipe and connected to the inner wall of the old pipe by way of a full-surfaced bonding connection, wherein the self-supporting pipe is formed from the lining hose, thus a composite hose.

Accordingly, a method for renovating a pressure pipe amid the application of a lining hose of the type described here is suggested with the present invention. This method comprises the incorporation of a lining hose, which is typically already impregnated with resin on the part of the manufacturer, into the old pipe, which can be effected in a single working step. Then, or thereby, a bonding connection is created between the lining hose and the inner wall of the old pipe, which can be effected e.g. by way of the lining hose being inflated and by way of this being brought into contact with the inner wall of the old pipe, at least quasi over the whole surface. The bonding connection is thereby either accomplished by way of adhesive of an optionally provided additional adhesive layer or by the resin of the second layer, which in this case itself comprises an adhesive, additionally to the polyester resin or the vinyl ester resin. Finally, the method envisages a curing of the resin, so that the lining hose forms a self-supporting pipe which is connected to the old pipe in a manner bonding over the whole surface. The bonding connection thereby is also determined as being over the whole surface, even if the lining hose forms creases at comparatively few locations, at which the pressure pipe has direction changes. The lining hose or the self-supporting pipe which is formed therefrom however bears on the old pipe without any gaps, at least in the straight sections of the pressure pipe.

The incorporation of the lining hose into the old pipe can be effected e.g. by way of reversing. The hose for example can be reversed into the pressure pipe to be renovated, thus by way of everting or turning inside out, with the help of a pressure drum for example, before the resin cures and the lining hose forms the self-supporting pipe.

The self-supporting pipe, which the lining hose is suitable for forming, with typical embodiments of the suggested lining hose has rated stiffness defined in the DIN standard 16868-1 of at least SN 630 or a nominal stiffness or ring rigidity of at least 630 $N/m^2$. Thereby, the lining hose is noticeably in the position of forming a self-supporting pipe of this stiffness, even without the supporting old pipe, thus in particular independently of any remaining supporting function of the old pipe, which can be present to a greater or lesser degree and even be negligible under certain conditions, depending on the condition of the old pipe. In this context, a pipe is indicated as being self-supporting when it has a nominal rated stiffness of the specified magnitude mentioned above of at least 630 $N/m^2$. The self-supporting pipe which can be formed from the lining hose under certain circumstances and depending on the embodiment, and in particular depending on the wall thickness, can of course also have a significantly greater rated stiffness of e.g. up to SN 10000 and even beyond this with nominal pressure above 25 bar.

The thickness of the second layer of the lining hose for this can be between e.g. 3 mm and 20 mm, or between 4 mm and 20 mm In this manner, the lining hose can be designed such that the self-supporting pipe which is formed therefrom, depending on the design and even without the support of the old pipe, can accommodate pressures of at least 0.5 bar or 1 bar or also for example up to 25 bar or, with a suitable selection and arrangement of the fibres and of the statically required hose thickness for example can even accommodate 50 bar, and thereby remains sealed or tight, after the curing of the resin. The self-supporting pipe which is formed from the lining hose can thus accommodate loads, such as for example earth loads, subterranean water or traffic loads, or operating pressures or also vacuums, which are present at the pressure pipe in the inside, and this being the case even if the old pipe can no longer perform a mechanical support.

The lining hose can thus be designed such that the first layer which is provided for forming an inner surface of the renovated pressure pipe is arranged outside the second layer, so that the lining hose is suitable for incorporation into the pressure pipe to be renovated, by way of reversing. Other embodiments envisage the first layer provided for forming the inner surface of the renovated pressure pipe being arranged within the second layer, so that the lining hose is suitable for incorporation into the pressure pipe to be renovated, by way of drawing in.

The resin e.g. can be selected such that on impregnating the textile sheet formation, it has a viscosity of between 500 mPa or 600 mPa and 25000 mPa. The resin at such a viscosity can simply be brought into connection with the textile sheet formation and be uniformly distributed therein. The resin can preferably be thickened. In particular, it can be advantageous if the resin comprises a thickening agent, so that it thickens after the impregnation of the textile sheet formation and then at a temperature of 20° C. has a viscosity e.g. of between 100000 mPas and 500000 MPas or between 75000 and 750000 mPas. An inorganic substance, such s e.g. magnesium oxide can be used as a thickening agent. A chemical reaction leading to the thickening can thereby be accelerated by way of heat. A flowing within the textile sheet formation or a running-out from the second layer, e.g. on account of a gradient can be prevented by way of the thickening of the resin which thereby does not yet cure. This permits a storage and a transport of the lining hose without any problems. For this reason, the lining hose in this embodiment is particularly suitable for a preparation remote from the location of application, so that the effort at the building site itself can be kept extraordinarily low. In particular, it is not necessary to impregnate the sheet formation with the resin only when at the actual location of use. An impregnation at the application location however can also make sense under certain circumstances and is therefore not to be ruled out.

An acrylic resin or an epoxy resin as an adhesive is provided for creating the bonding connection of the lining hose to the pressure pipe to be renovated. The adhesive can be deposited onto the second layer on a surface of the second layer which is away from the first layer, wherein the adhesive layer in a cured condition is suitable for creating a bonding connection between the self-supporting pipe and an inner side of the pressure pipe to be renovated. Inasmuch as the lining hose is to be brought into the old pipe by way of reversing, the adhesive layer can be created by way of filling the adhesive into the lining hose and being distributed on the surface which firstly lies to the inside, for example by way of the lining hose being drawn through a roller pair with a defined gap. Thereby, under certain circumstances, it can be necessary to pull apart plies (layers) of the lining hose which lie on one another, or to inflate the lining hose for this, for filling in the adhesive. With regard to the adhesive for forming the adhesive layer, as mentioned, it is the case of an acrylic resin or a resin based on epoxides, which is to say an epoxy resin. In particular Starline® EXPRESS resin which is known from a different context is considered as an adhesive. The application or depositing of the adhesive under certain circumstances can be effected not until at the location of application, thus at the building site, even if the impregnation of the second layer with the resin, and the connection of the first and second layer under certain circumstances is effected much earlier and preferably before the transport to the application location.

With other embodiments, the resin, with which the textile sheet formation of the second layer is impregnated, additionally to the polyester resin or the vinyl ester resin can itself contain the adhesive and by way of this itself can be selected such that in the cured condition, it is suitable for creating a bonding connection between the self-supporting pipe and an inner side of the pressure pipe to be renovated. In this case, the resin is thus a mixture of a resin which is suitable for forming a self-supporting pipe and is at least mainly of polyester resin or vinyl ester resin, and of the adhesive, wherein the adhesive in this case too is an acrylic resin or an epoxy resin. The mixture can thereby be created by way of mixing the first-mentioned resin and the adhesive in liquid form, or e.g. by way of stirring in small balls, in which the adhesive is enclosed and which for example can have wax envelopes. In these cases, a part of the resin can exit outwards out of the second layer during the restoring of the old pipe, and thus effect a gapless, non-positive and complete bonding to the pressure pipe to be restored, on incorporating the lining hose into the pressure pipe to be restored. The resin is then selected in dependence on the material of the pressure pipe to be restored, such that it not only produces the self-supporting pipe, but also a bonding connection between the self-supporting pipe and the pressure pipe to be restored, which is to say renovated. The components of the resin which are formed by the vinyl ester resin or polyester resin in this case can e.g. assume a mass share of between 50% and 95%, whereas the adhesive typically forms a mass share of at least 5% of the resin.

The migration or infiltration of gas between the self-supporting pipe and the pressure pipe to be restored is e.g. prevented due to the bonding to the pressure pipe to be restored. Such gas migration can form explosive mixtures in cavities irrespective of their type, and these must be prevented for reasons of explosion safety. In the case of drinking water, infectious germs could then penetrate from the outside (in the region of contaminated soil) into the conduit, in the case where there is no bonding to the old pipe, e.g. in the region of drillings, and specifically in particular in conduits which are temporarily out of operation. On the other hand, water loss which indeed is to be ruled out by way of the renovation could also occur.

The first layer which forms the diffusion barrier and is to give the renovated pressure pipe the necessary sealedness, in particular can be non-permeable to the resin or comprise a ply which is not permeable to the resin. The first layer can thereby be formed in different manners.

Thus the first layer of the multi-layer lining hose for its part e.g. can be a composite which comprises a low-diffusion film as well as a fibre-containing ply on a side of the film which faces the second layer. The fibre-containing ply can in turn be a woven fabric or knitted fabric or laid webs or a crocheted fabric. The fibre-containing ply, as with the textile sheet formation of the second layer, can thereby e.g. be formed of glass fibres or carbon fibres or contain glass fibres or carbon fibres. The fibre-containing ply of the first layer can alternatively also be formed e.g. from polyester. A connection between the fibre-containing ply and the film can e.g. be realised by way of the film being extruded onto the fibre-containing ply or the film being laminated onto the fibre-containing ply, e.g. by way of melting on the film. In the latter mentioned case, the fibre-containing ply can be formed by individual fibres which come to lie on the film in randomly distributed orientations and form a non-woven and for this e.g. can be sucked onto the superficially melted-on film.

Details as to how the film serving as the actual diffusion barrier can be manufactured and what sort of particular characteristics it can have, as well as details with regard to the fibre-containing ply carrying the diffusion barrier can be deduced for example from the documents WO 00/25057 A1 and WO 00/15992 A2. Comparable diffusion barriers are described there in a different context. In particular, the hose known from the Starline® EXPRESS method can be used for forming the first layer as a composite. In this case, the lining hose can be formed by way of the hose from the Starline® EXPRESS method being connected at a side which is opposite the diffusion barrier, to the textile sheet formation which for its part is hose-like and which then together with the fibre-containing ply of the hose forming the first layer is impregnated with the resin.

The embodiment of the first layer as a composite of this type of arrangement can simplify the manufacture of the lining hose and the connection of the first layer to the second layer. However, embodiments, with which the first layer is only formed by a film connected directly to the second layer are also possible.

The first layer can be connected to the second layer by way of the resin, with which the textile sheet formation of the second layer is impregnated. For this, the resin can be a part of the first layer, i.e. the mentioned fibre-containing ply of the first layer.

It is favourable if the resin, with which the textile sheet formation is impregnated, is not a self-curing resin, but is chemically or electromagnetically activated, in order to cause a curing. In this manner, it is ensured that the lining hose is capable of being stored and can be created possibly already long before the actual restoration work—under certain circumstances with the exception of the adhesive layer which is possibly not deposited until at the application location—and can be transported to the application location such that the renovation can take place there in a single working step. In particular, the resin can be a resin which is curable by way of UV radiation or other electromagnetic radiation, in particular by way of light in the close UV range. Thus one can ensure that the curing is not triggered until within the pressure pipe to be renovated. Devices for incorporating suitable activating radiation into pressure pipes to be renovated are known per se from a different context. As a rule, it is sufficient for a UV lamp or other radiation source to be led through the hose brought into the old pipe. If it is not the resin of the second layer, but an additional adhesive layer which is envisaged for the connection of the lining hose to the old pipe, then this adhesive layer can be activated by the same or similar radiation, thus in particular e.g. by way of UV radiation. The time in which the pressure pipe conduit is not in operation is as low as possible due to this accelerated curing process.

Concluding, the suggested lining hose for lining a pressure pipe to be renovated can comprehensively be described as at least one first layer and a second layer which is adjacent the first layer, wherein the first layer forms a fluid-tight and/or gas-tight barrier and wherein the second layer is a textile sheet formation which is impregnated with a resin, has a thickness of at least 3 mm and is configured for a gapless and full-surfaced non-positive bonding connection to an inner wall of the pressure pipe to be renovated, wherein the lining hose is flexible in a condition, in which the resin is not cured and wherein the textile sheet formation and the resin are selected such that the lining hose in a condition, in which the resin has cured, forms a self-supporting pipe. Thereby, the textile sheet formation together with the resin forms a fibre-reinforced plastic, wherein the resin is or contains an unsaturated polyester resin or an unsaturated vinyl ester resin, wherein additionally an acrylic resin or epoxy resin is provided as an adhesive, which either as an adhesive layer which in the cured condition is suitable for creating a bonding connection between the self-supporting pipe and an inner side of the pressure pipe to be renovated, is deposited on a surface of the second layer which is away from the first layer, or which together with the polyester resin or vinyl ester resin as a mixture forms the resin, with which the textile sheet formation of the second layer is impregnated. The resin thereby can preferably be thickened. Thus is can comprise a thickening agent, so that the textile sheet formation can be impregnated with the resin on manufacture of the lining hose, when this is still significantly more fluid that after the thickening, which of course is not to be effected until afterwards. It then obtains a significantly greater viscosity due to this—even before the actual curing—than on impregnating the textile sheet formation, so a running of the resin out of the second layer or an undesirable redistribution within the second layer by way of flowing is prevented. The lining hose can be stored and transported without any problem on account of this.

The textile sheet formation which is impregnated with the resin can be designed such that it overlaps itself in a strip running along the lining hose, wherein two edges of the textile sheet formation are only applied over one another there, but are not sewn to one another. The overlapping edges can be displaced to one another in the peripheral direction by way of this, so that the second layer can be widened without any problem, without the textile sheet formation having to be intrinsically stretched for this. This can be helpful on reversing or with a widening of the lining hose within the old pipe as the case may be. With regard to the textile sheet formation, under certain circumstances it can be the case of a complex of a woven fabric or laid webs, formed from glass fibre, and a textile glass mat, wherein the woven fabric or laid webs is/are then preferably orientated such that the glass fibres partly lie in the peripheral direction and partly in the longitudinal direction. One can envisage the woven fabric or laid webs thereby having more glass fibres lying in the peripheral direction than in the longitudinal direction, per surface unit.

The textile sheet formation which is impregnated with the resin for its part can also comprise two, three or more plies, for which that applies, which has been discussed regarding the textile sheet formation in the paragraph above. Each of these plies can thus in each case overlap itself in a strip running along the lining hose, wherein two edges of the respective ply are only applied or laid over one another there, without being sewn. The plies in this case are preferably laid such that the mentioned strips do not lie over one another, but at different locations of the lining hose in the peripheral direction. In this case, each of these plies can also be formed by a complex of the type described above in each case.

BRIEF DESCRIPTION OF THE DRAWINGS

Embodiment examples of the invention are explained hereinafter in more detail by way of the figures. There are shown in.

DETAILED DESCRIPTION

Figure 1:
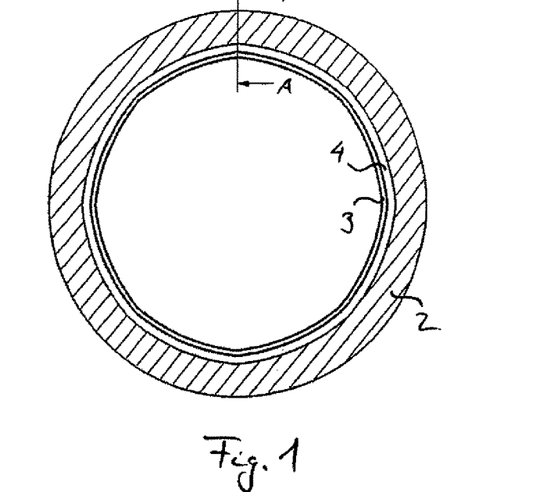
FIG. 1 a cross section through a lining hose.
Figure 1A:
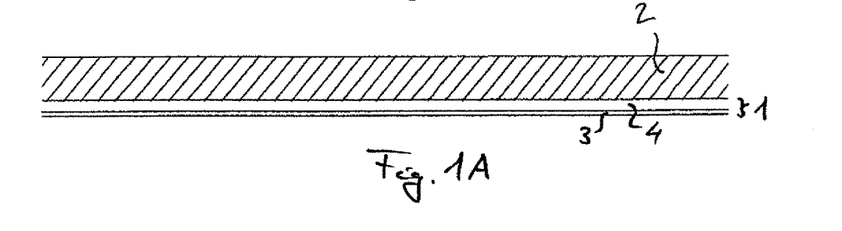
FIG. 1A a longitudinal section through this lining hose at the location indicated at A-A in FIG. 1, FIG. 2 a modification of the lining hose of FIG. 1, in cross section, FIG. 3 a modification of the lining hose of FIG. 2, in cross section, FIG. 4 another modification of the lining hose of FIG. 2, in cross section, FIG. 5 a cross section through a lining hose in another embodiment, FIG. 5A a longitudinal section through lining hose of FIG. 5 at the location indicated there at B-B, FIG. 6 a cross section through a renovated pressure pipe which is renovated amid the use of the lining hose from the FIG. 1 and FIG. 1A or from one of the FIGS. 2 to 4, and FIG. 6A a longitudinal section through the renovated pressure pipe of FIG. 6, at the location indicated there at C-C.

The lining hose shown in FIGS. 1 and 1A comprises a first layer 1 and a second layer 2 surrounding the first layer 1. Thereby, the first layer 1 of the multi-layered lining hose which forms a diffusion barrier, in the present embodiment example is designed as a two-ply composite with a low-diffusion film 3 and a fibre-containing ply 4 which lies between the film 3 and the second layer 2.

The second layer 2 is given by a textile sheet formation which is impregnated with resin, wherein the resin is not self-curing, but only after activation by way of electromagnetic radiation, preferably UV light. Thereby, the second layer 2 with a wall thickness of e.g. 5 mm is so thick and the resin of such a nature, that the firstly flexible lining hose after curing of this resin forms a self-supporting pipe of a nominal stiffness of far above 630 N/m$^2$ or a rated stiffness of far above SN 630. Thereby, the resin together with the textile sheet formation not only forms a fibre-reinforced plastic, but also creates a connection to the first layer 1, whose fibre-containing ply 4 is likewise penetrated by the resin. With regard to the textile sheet formation, it can be the case e.g. of a woven fabric or laid webs or crocheted fabrics or knitted fabrics, which e.g. can be formed completely of mainly from glass fibres or carbon fibres.

The resin, with which the textile sheet formation of the second layer 2 is impregnated, mainly contains an unsaturated polyester resin or an unsaturated vinyl ester resin. Thereby, it is the case of a styrene-containing or styrene-free resin, depending on the embodiment. The resin makes up a weight share of between 30% and 70% of the second layer 2. The resin which on impregnating the textile sheet formation has a viscosity of the magnitude of 10000 mPas, can thereby be provided with a thickening agent such as magnesium oxide for example, so that it can subsequently be thickened—even before the activation of the resin—so that at a temperature of 20° C. it then has a viscosity of about 200000 mPas. In this condition, the lining hose is flexible as was hitherto the case and can be easily stored and transported.

With regard to the fibre-containing ply 4, it is the case of a woven fabric hose of warp threads and weft threads, which are at least mainly from glass fibres or carbon fibres and on which threads a material forming the film 3 is extruded. Thereby, the film 3 which has a thickness of about 50 µm can be formed from e.g. PU—for example a thermoplastic polyurethane elastomer—or of polyamide. Other possible materials for the low-diffusion film 3 are polyester, polyethylene as well as co-polymers of ethylene or α-olefins. The fibre-containing ply, with one modification can be formed from laid webs or crocheted fabric or knitted fabric, instead of the woven [fabric] hose. Polyester fibres can also be used for the woven fabric forming the ply 4, instead of glass fibres or carbon fibres. A special design results if the hose known from the Starline® EXPRESS method is used as a first layer 1. A special modification of the lining hose envisages the first layer 1 being formed by way of the film 3 being superficially melted and laminated onto the fibre-containing ply 4, which thus form a type of non-woven on the film 3. The first layer 1 is then formed by a laminated film. The low-diffusion film 3 in particular functions as a styrene barrier if the mentioned resin is not free of styrene. In any case it is impermeable to the resin.

The lining hose of the FIGS. 1 and 1A is suitable for renovating or restoring pressure pipes, and specifically even if these have not only become leaky, but can also no longer withstand mechanical loading due to weakening, for example because of corrosion. For this, the finished lining hose is transported to a building site, from which an opening of the old pipe to be renovated is accessible. There the lining hose is pulled into the old pipe, thus into the original pressure pipe conduit, and is inflated such that a fully surfaced, gapless bonding connection is created between the lining hose and the old pipe.

This bonding connection with the present embodiment example can be created by way of the resin exiting at the surface from the second layer 2. For this, the resin as a mixture is formed from the vinyl ester resin or polyester resin, which is suitable for forming a self-supporting pipe, and an adhesive, wherein an acrylic resin or an epoxy resin are considered as an adhesive and wherein the adhesive under certain circumstances can be present in the resin in the form of small balls—enclosed e.g. in wax enclosures. The resin however is typically a homogeneous mixture, in which the vinyl ester resin or the polyester resin makes up a mass share of between 50% and 95%, whereas the adhesive which is formed by the acrylic resin and the epoxy resin make up a mass share of at least 5% of the resin.

A radiation source, e.g. a light source in the UV or near-UV range is subsequently led through the lining hose arranged within the old pipe, by which means a curing process of the resin is activated. The lining hose forms a self-supporting pipe of the stiffness mentioned above, which serves for sealing the old pipe as well as for restoring the pressure loading capacity of the pressure pipe conduit, which was originally formed only by the old pipe. The thus restored pressure pipe conduit can again withstand pressures of, under certain circumstances, up to 25 bar or even 50 bar, independently of the previous load bearing capability of the old pipe.

Figure 2:
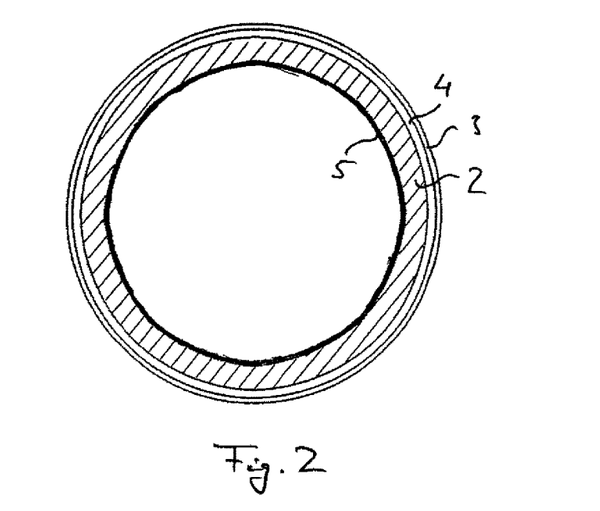

A modification of the lining hose of the FIGS. 1 and 1A is shown in FIG. 2. Recurring features here and in the following figures are always provided with the same reference numerals and are not described individually. The lining hose of FIG. 2 differs for the preceding embodiment example only by way of an additional adhesive layer 5 which can replace the adhesive which is contained in the resin of the second layer 2 itself, as well as by way of the second layer 2, the fibre-containing ply 4 of the first layer 1 and the low-diffusion film 3 of the first layer being arranged in the reverse sequence, so that the film 3 lies at the outside. In this form, the lining hose which for this is suitably flexible is suitable for bringing into the old pipe by way of reversing. The renovation of an old pipe with this lining hose is effected in the same manner as described above with the single difference that the lining hose is introduced into the pressure pipe to be renovated by way of reversing, e.g. by way of a pressure drum. As to how such a reversion process can be carried out, is described in another context, e.g. in the documents WO 00/25057 A1 and WO 00/15992 A2.

The adhesive layer 5, which is firstly formed on an inner surface of the lining hose, on reversing comes into contact with the inner surface of the old pipe, and by way of this creates the full-surfaced bonding connection to the old pipe. Acrylic resin or a resin based on epoxides, thus an epoxy resin is applied as an adhesive for forming the adhesive layer 5. In particular, it can thereby be the case of the adhesive, with which a connection between lining hose and the old pipe is created with the known Starline® EXPRESS method. The adhesive is filled into the lining hose for forming the adhesive layer and the lining hose is then pulled through a roller pair, so that the adhesive is uniformly distributed, before the lining hose is reversed into the old pipe. Under certain circumstances, one can make do without the adhesive layer 5, if a mixture of the type described in the context of FIGS. 1 and 1A is used for the resin, with which the textile sheet formation is impregnated, so that the resin itself has adequately good bonding characteristics.

Figure 3:
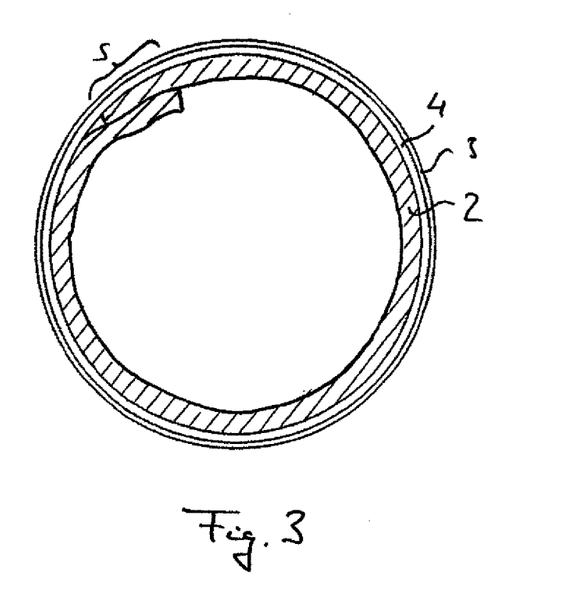
Figure 4:
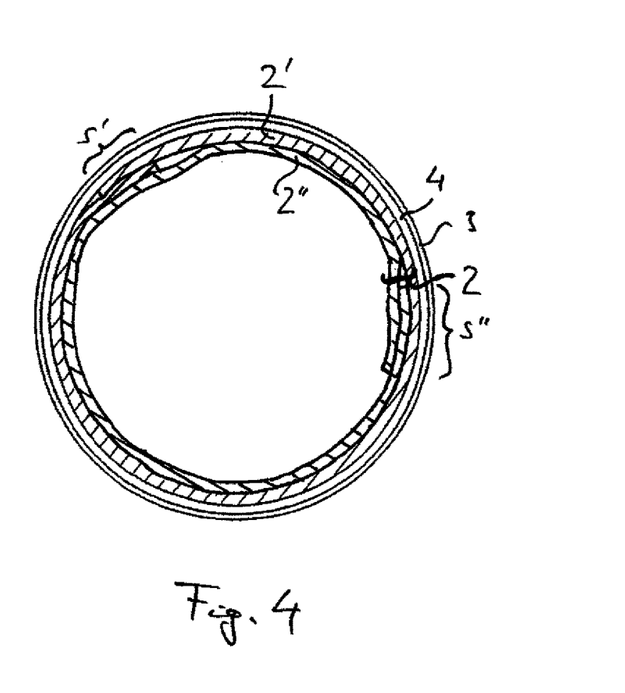

Two embodiment examples of such lining hose are shown in the FIGS. 3 and 4, each likewise as a cross section. These lining hoses in the present case are also designed to be brought into the old pipe to be renovated, by way of reversing. For this reason, the first layer formed form the film 3 and the fibre-contain layer 4 also lies to the outside and the second layer 2 to the inside. That which has been said regarding the first layer 1 of the embodiment example of FIGS. 1 and 1A is also valid regarding the construction of the first layer. The resin, which together with the textile sheet formation forms the second layer 2, in both cases is again a mixture of unsaturated vinyl ester resin or polyester resin, which is present in a mass share of between 50% and 95%, and of an epoxy resin or acrylic resin as adhesive with a mass share of at least 5% in accordance with this.

It can be recognised from FIG. 3, that the textile sheet formation, which together with the resin forms the second layer 2, is laid such that it overlaps itself in a strip s running along the lining hose, wherein two edges of the textile sheet formation there are only applied which is to say laid over one another, but however are not sewn to one another. The two edges overlapping one another can displace to one another in the circumferential direction by way of this, so that the second layer 2 can be widened without any problem, when the lining hose is reversed and, if necessary widened, and specifically without the textile sheet formation having to be intrinsically stretched for this. With regard to the textile sheet formation, under certain circumstances it is itself the case of a complex of a woven fabric or laid webs, which are formed from glass fibre, and of a textile glass mat, wherein the woven fabric or laid webs is/are orientated such that the glass fibres partly lie in the peripheral direction and partly in the longitudinal direction of the lining hose. Thereby, a high load bearing capability is particularly important in the peripheral (circumferential) direction, which is why one can envisage the woven fabric or laid webs per surface unit having more glass fires lying in the peripheral direction than glass fibres lying in the longitudinal direction.

The embodiment of FIG. 4 differs from the lining hose from FIG. 3 only by way of the fact that the textile sheet formation, which together with the resin forms the second layer 2, for its part comprises two plies 2' and 2", for which in each case that which has been said with regard to the textile sheet formation from the previous embodiment example applies. Each of these plies 2' and 2" overlaps itself here in each case in a strip s' or s" which runs along the lining hose, and specifically in each case without a seam. Thereby, the plies 2' and 2" are laid such that these strips s' and s" do not lie over one another, but at different locations in the peripheral direction, so that the textile sheet formation is not formed too thickly at any location.

Figure 5:
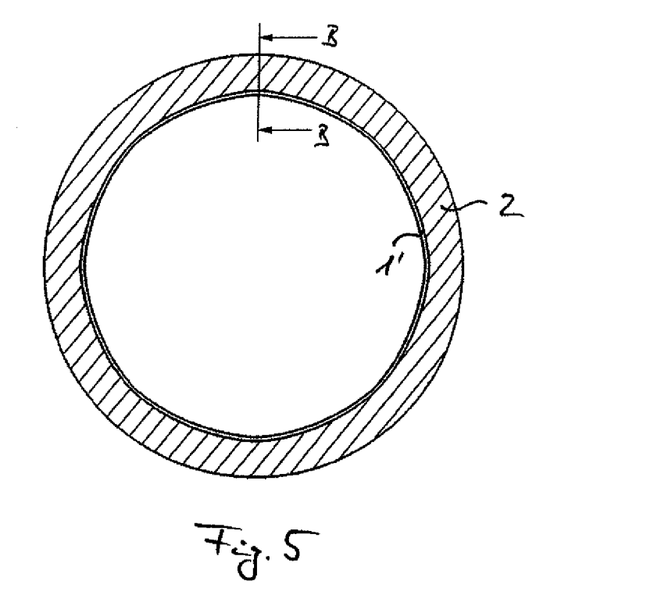
Figure 5A:
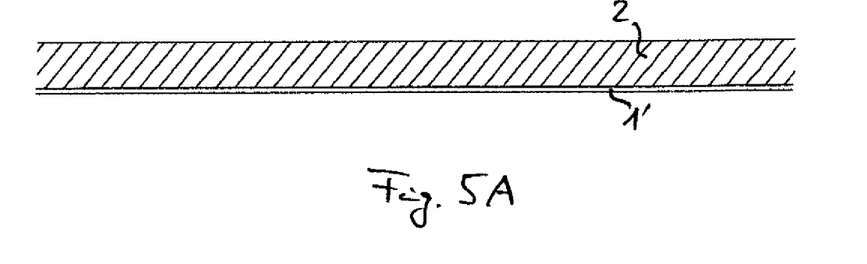

A modification of the lining hose which has been described until now and which differs from the previous embodiment example only in that the first layer 1' here is only formed by a film serving as a diffusion barrier and is connected directly to the second layer 2, is shown in FIGS. 5 and 5A. In this case too, the connection between the first layer 1' and the second layer 2 can be created by the resin, with which the textile sheet formation of the second layer 2 is impregnated. This lining hose can also alternatively be designed in a manner turned anticlockwise and then, as with the lining hose from FIGS. 2 to 4, can be brought into the old pipe to be renovated by way of reversing instead of drawing in.

Figure 6:
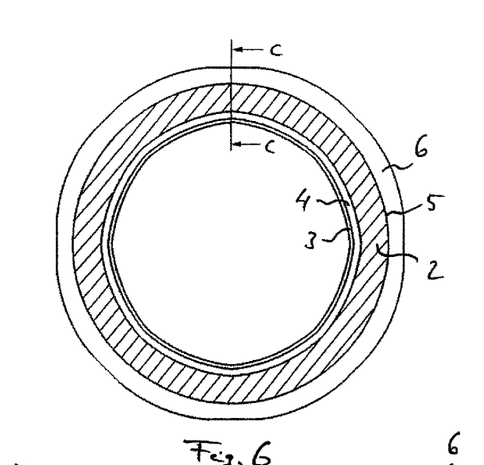
Figure 6A:
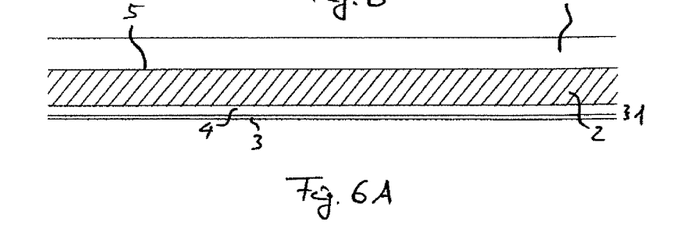

A renovated pressure pipe is shown in FIGS. 6 and 6A, which results from the described method for renovating or restoring an old pipe 6. Here, the self-supporting pipe which the lining hose of FIGS. 1 and 1A or of one of the FIGS. 2 to 4 forms after the curing of the resin, is arranged within the old pipe 6 which is now required only for shaping and does not need to withstand any mechanical loads. Thereby, the mentioned self-supporting pipe, in which the second layer 2 functions as a statically effective layer, is connected in a fully surfaced and gapless manner to the inner surface of the old pipe 6 by the adhesive of the adhesive layer 5 or parts of the resin of the second layer 2. Thus a gapless, non-positive bonding connection exists between the inner surface of the old pipe 6 and the second layer 2, by which means the migration of gas of the self-supporting pipe formed by the lining hose is prevented. The old pipe 6 can have a pipe diameter of between 100 mm and 2000 mm, preferably a diameter between 200 mm and 1200 mm Thereby, the described renovating method can also be carried out in a single working step by way of introducing the lining hose, even of the old pipe and accordingly then also the renovated pressure pipe has direction changes, and specifically advantageously in a closed construction manner. Only a few cleaning and reversion pits are therefore necessary.

The invention claimed is:

1. A lining hose for lining a pressure pipe to be renovated, said lining hose comprising:
    at least one first layer and a second layer which is adjacent the first layer,
    wherein the first layer forms a fluid-tight and/or gas-tight diffusion barrier and is formed by a composite that comprises a low-diffusion film and a fiber-containing ply on a side of the film that faces the second layer,
    wherein the second layer is a textile sheet formation which is impregnated with a resin, has a thickness of at least 3 mm and is configured for a gapless and full-surfaced, non-positive bonding connection to an inner wall of the pressure pipe to be renovated,
    wherein the lining hose is flexible in a condition in which the resin is not cured and wherein the textile sheet formation and the resin are selected such that the lining hose forms a self-supporting pipe in a condition in which the resin is cured,
    wherein the textile sheet formation together with the resin forms a fiber-reinforced plastic,
    wherein the resin is or contains an unsaturated polyester resin or an unsaturated vinyl ester resin, and
    wherein an acrylic resin or epoxy resin is additionally provided as an adhesive, which either as an adhesive layer which in a cured condition is suitable for creating a bonding connection between the self-supporting pipe and an inner side of the pressure-pipe to be renovated, is deposited on a surface of the second layer which is away from the first layer or which together with the polyester resin or vinyl ester resin as a mixture forms the resin with which the textile sheet formation of the second layer is impregnated.

2. The lining hose according to claim 1, wherein the self-supporting pipe which is suitable for forming the lining hose, has a rated stiffness of at least SN 630 or a nominal stiffness of at least 630 N/m2.

3. The lining hose according to claim 1, wherein the first layer which is provided for forming an inner surface of the renovated pressure pipe is arranged outside the second layer, so that the lining hose by way of reversing is suitable for incorporation into the pressure pipe to be renovated.

4. The lining hose according to claim 1, wherein the first layer which is provided for forming an inner surface of the renovated pressure pipe is arranged within the second layer, so that the lining hose by way of drawing in is suitable for incorporating into the pressure pipe to he renovated.

5. A lining hose for lining a pressure pipe to be renovated, said lining hose comprising:

at least one first layer and a second layer which is adjacent the first layer, wherein the first layer forms a fluid-tight and/or gas-tight diffusion barrier and wherein the second layer is a textile sheet formation that is impregnated with a resin, has a thickness of at least 3 mm and is configured for a gapless and full-surfaced, non-positive bonding connection to an inner wall of the pressure pipe to be renovated, wherein the lining hose is flexible in a condition in which the resin is not cured and wherein the textile sheet formation and the resin are selected such that the lining hose forms a self-supporting pipe in a condition in which the resin is cured, wherein the textile sheet formation together with the resin forms a fiber-reinforced plastic, wherein the resin contains an unsaturated polyester resin or an unsaturated vinyl ester resin and comprises a thickening agent and is thickened such that it has a viscosity of between 100000 mPas and 500000mPas at 20° C., and wherein an acrylic resin or epoxy resin is additionally provided as an adhesive, which either as an adhesive layer which in a cured condition is suitable for creating a bonding connection between the self-supporting pipe and an inner side of the pressure pipe to be renovated, is deposited on a surface of the second layer which is away from the first layer or which together with the polyester resin or vinyl ester resin as a mixture forms the resin with which the textile sheet formation of the second layer is impregnated.

6. The lining hose according to claim 5, wherein the resin is selected such that in the cured condition it is suitable for creating a bonding connection between the self-supporting pipe and an inner side of the pressure pipe to be renovated.

7. The lining hose according to claim 5, wherein the first layer is impermeable to the resin or comprises a ply which is impermeable to the resin.

8. The lining hose according to claim 5, wherein the first layer is connected to the second layer by way of the resin.

9. The lining hose according to claim 5, wherein the resin is a resin which can be cured by way of UV radiation or other electromagnetic radiation.

10. The lining hose according to claim 5, wherein the textile sheet formation is formed from glass fibers or carbon fibers or fibers of PES or PET.

11. The lining hose according to claim 5, wherein the resin is styrene-free.

12. A renovated pressure pipe, said pressure pipe comprising:

an old pipe and a self-supporting pipe arranged within the old pipe and connected to an inner wall of the old pipe by way of a complete-surfaced bonding connection, wherein the self-supporting pipe is formed from a lining hose comprising:

at least one first layer and a second layer which is adjacent the first layer, wherein the first layer forms a fluid-tight and/or gas-tight diffusion barrier and is formed by a composite which comprises a low-diffusion film and a fiber-containing ply on a side of the film which faces the second layer, wherein the second layer is a textile sheet formation which is impregnated with a resin, has a thickness of at least 3 mm and is configured for a gapless and full-surfaced, non-positive bonding connection to an inner wall of the pressure pipe to be renovated, wherein the lining hose is flexible in a condition in which the resin is not cured and wherein the textile sheet formation and the resin are selected such that the lining hose forms a self-supporting pipe in a condition in which the resin is cured, wherein the textile sheet formation together with the resin forms a fiber-reinforced plastic, wherein the resin is or contains an unsaturated polyester resin or an unsaturated vinyl ester resin, and wherein an acrylic resin or epoxy resin is additionally provided as an adhesive, which either as an adhesive layer which in a cured condition is suitable for creating a bonding connection between the self-supporting pipe and an inner side of the pressure-pipe to be renovated, is deposited on a surface of the second layer which is away from the first layer, or which together with the polyester resin or vinyl ester resin as a mixture forms the resin with which the textile sheet formation of the second layer is impregnated.

13. A method for renovating a pressure pipe amid the use of a lining hose wherein the method comprises the following steps:

obtaining or providing a lining hose comprising: at least one first layer and a second layer which is adjacent the first layer, wherein the first layer forms a fluid-tight and or gas-tight diffusion barrier and is formed by a composite which comprises a low-diffusion film and a fiber-containing ply on a side of the film which faces the second layer, wherein the second layer is a textile sheet formation which is impregnated with a resin, has a thickness of at least 3 mm and is configured for a gapless and full-surfaced, non-positive bonding connection to an inner wall of the pressure pipe to be renovated, wherein the lining hose is flexible in a condition in which the resin is not cured and wherein the textile sheet formation and the resin are selected such that the lining hose forms a self-supporting pipe in a condition in which the resin is cured, wherein the textile sheet formation together with the resin forms a fiber-reinforced plastic, wherein the resin is or contains an unsaturated polyester resin or an unsaturated vinyl ester resin, and wherein an acrylic resin or epoxy resin is additionally provided as an adhesive, which either as an adhesive layer which in a cured condition is suitable for creating a bonding connection between the self-supporting pipe and an inner side of the pressure-pipe to be renovated, is deposited on a surface of the second layer which is away from the first layer, or which together with the polyester resin or vinyl ester resin as a mixture forms the resin with which the textile sheet formation of the second layer is impregnated, incorporating the lining hose into an old pipe in a single working step, creating a bonding connection between the lining hose and an inner wall of the old pipe, and curing the resin, so that the lining hose forms a self-supporting pipe which is connected to the old pipe in a bonding manner over the whole surface.

14. The method according to claim 13, wherein the resin on impregnating the textile sheet formation has a viscosity of between 600 mPas and 25000 mPas.

15. A method for renovating a pressure pipe amid the use of a lining hose wherein the method comprises the following steps:

obtaining or providing a lining hose comprising: at least one first layer and a second layer that is adjacent the first layer, wherein the first layer forms a fluid-tight and/or gas-tight diffusion barrier and wherein the second layer is a textile sheet formation that is impregnated with a resin, has a thickness of at least 3 mm and is configured for a gapless and full-surfaced, non-positive bonding connection to an inner wall of the pressure pipe to be renovated, wherein the lining hose is flexible in a condition in which the resin is not cured and wherein the textile sheet formation and the resin are selected such that the lining hose forms a self-supporting pipe in a condition in which the resin is cured, wherein the textile sheet formation together with the resin forms a fiber-reinforced plastic, wherein the resin contains an unsaturated polyester resin or an unsaturated vinyl ester resin and comprises a thickening agent, so that after the impregnating of the textile sheet formation it thickens to a viscosity of between 100000 mPas and 500000 mPas, and wherein an acrylic resin or epoxy resin is additionally provided as an adhesive, which either as an adhesive layer that in a cured condition is suitable for creating a bonding connection between the self-supporting pipe and an inner side of the pressure-pipe to be renovated, is deposited on a surface of the second layer which is away from the first layer, or which together with the polyester resin or vinyl ester resin as a mixture forms the resin with which the textile sheet formation of the second layer is impregnated, incorporating the lining hose into an old pipe in a single working step, creating a bonding connection between the lining hose and an inner wall of the old pipe, and curing the resin, so that the lining hose forms a self-supporting pipe that is connected to the old pipe in a bonding manner over the whole surface.

* * * * *